Patented Oct. 6, 1931

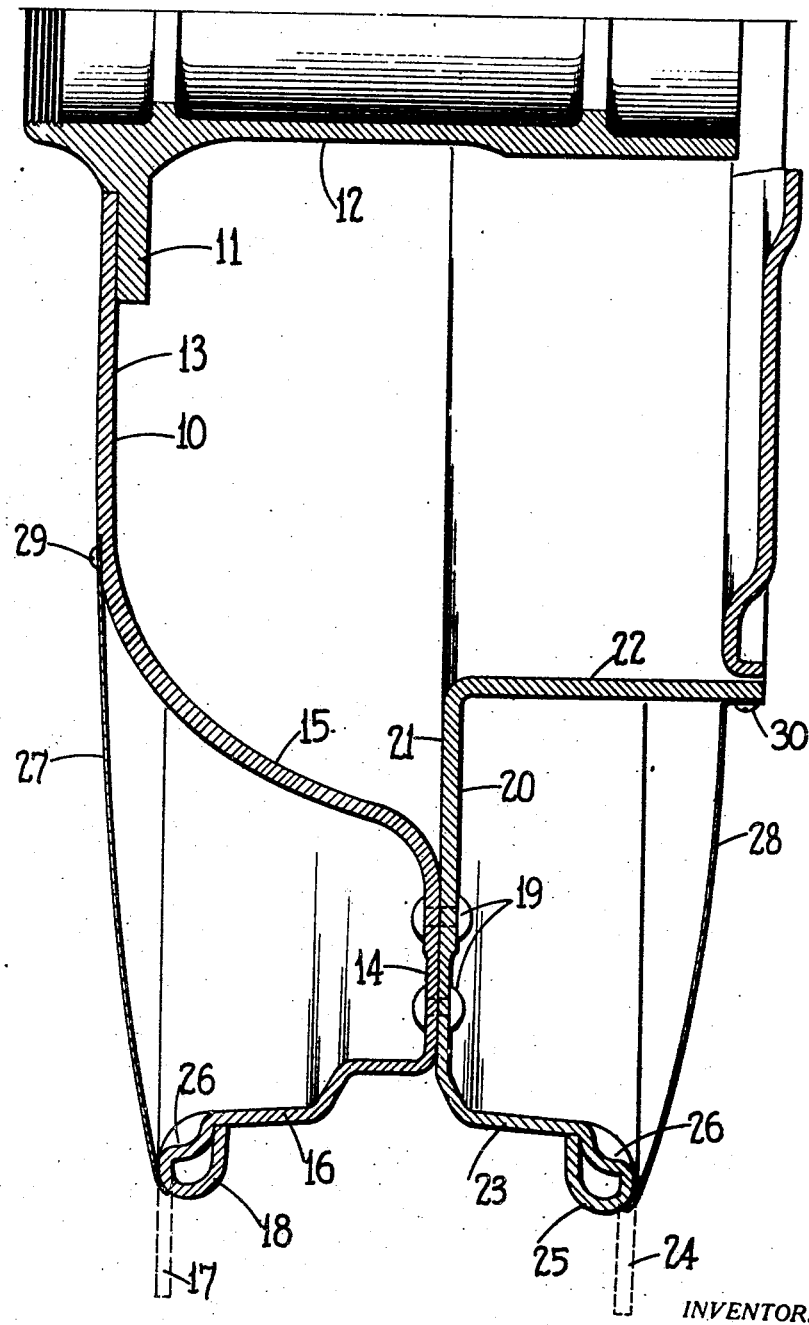

1,826,617

UNITED STATES PATENT OFFICE

GERHARD C. R. KUIPER, OF INDIANAPOLIS, INDIANA, ASSIGNOR TO BUDD WHEEL COMPANY, OF PHILADELPHIA, PENNSYLVANIA, A CORPORATION OF PENNSYLVANIA

VEHICLE WHEEL

Application filed November 7, 1929. Serial No. 405,305.

This invention relates to demountable vehicle wheels of the disk type and is directed more particularly to improvements in the construction thereof so as to render the same suitable for use as airplane landing wheels.

Among the principal objects of the present invention is the provision of a single disk type of vehicle wheel which is not only very economical and simple in construction but which is also extremely light in weight without any sacrifice in strength.

A further object of the invention is the provision of a vehicle wheel which embodies as an integral element thereof a concealed brake drum, this brake drum being so arranged and disposed relatively to the body of the wheel as to facilitate the stream lining of the latter in order to generally enhance the external appearance thereof.

A still further object of the invention is the provision of a vehicle wheel the rim of which is circumferentially continuous in extent, one portion of this rim being formed integrally with the body of the wheel and the other portion thereof integrally with the brake drum.

Still another object of the invention is the provision in a vehicle wheel of the character described of rim flanges, these flanges being respectively rolled out of the stock of which the wheel disk and the brake drum are fabricated and being provided with means to reinforce and strengthen the same.

Other objects of the invention and advantages resulting therefrom will appear more fully hereinafter.

The invention consists substantially in the combination, construction, location and relative arrangement of parts, all as will be described more fully hereinafter, as shown in the accompanying drawing and as finally pointed out in the claim.

In the accompanying drawing, which shows a preferred form of and which is merely illustrative of the general principles of the invention, it will be observed that the wheel, which is constructed in accordance with this invention and designated generally by the reference numeral 10, is adapted to be demountably secured or attached in the usual manner to the annular flange 11 of the wheel hub 12. The central portion of the wheel disk proper is of substantially plane formation, as at 13, while the outer marginal portion thereof is rolled or otherwise fabricated to provide a circumferentially extending channel presenting outwardly of the body of the wheel. The base wall 14 of this channel lies substantially in a plane extending at right angles to the central axis of the wheel and substantially paralleling the plane central portion 13. The inner wall 15 of this channel is curvilinear in form and extends between the central plane portion 13 of the disk and the base wall 14 of the channel. The outer wall 16 of the channel extends axially of the wheel and during the formation of said channel is provided with a radially extending flange 17, the latter being shown in the drawing in broken lines. This radially extending flange 17 is adapted to be subsequently rolled or otherwise bent back upon itself, as at 18, to form a circumferentially extending rim flange, it being understood that the annular outer wall 16 of the channel formed in the disk body constitutes a part of the wheel rim.

Suitably secured to the base wall 14 of the channel formed in the wheel body, as by the rivets 19 or by welding, is a rolled annular channel 20 of substantial U cross-section the mouth of which is presented in a direction opposite to that of the channel formed in the wheel body. This annular channel 20 is provided with a base wall 21 which is adapted to be superposed against and secured to the outer plane portion 14 of the wheel disk, it being observed that the portions 21 and 14, when secured together in the manner just described, are disposed substantially in the vertical load plane of the wheel. The inner wall 22 of the rolled channel 20 is arranged concentrically with respect to the wheel axis and serves as a brake drum therefor. The outer wall 23 of the brake drum channel 20 extends axially of the wheel and in a direction opposite to that of the corresponding wall 16 of the wheel body proper. As in the case of said annular wall 16, the annular wall 23 is also provided with a radially extending flange 24 which is adapted to be rolled or bent over, as at 25, to form a circumferentially extending rim flange which is adapted to cooperate with the similarly formed rim flange 18 to retain in pneumatic tire in position upon the wheel rim. It will be observed that these rim flanges are of substantially tubular construction and in order to further reinforce and strengthen the same the inner sides thereof are each provided with a series of circumferentially spaced depressions or indentations 26.

In order to complete and generally enhance the external appearance of the wheel a pair of disks 27 and 28, preferably of sheet aluminum, are employed to respectively cover the mouths of the oppositely presenting channels formed in the outer marginal portion of the wheel. The outer marginal edges of these disks 27 and 28 are preferably welded to the rim flanges 18 and 25 respectively, while the inner edges thereof are respectively secured to the wheel disk by the screws 29 and to the outer edge of the brake drum 22 by the screws 30.

By combining, as shown in the figure, a wheel disk having an integrally formed rim portion with a rolled brake drum having an integrally formed rim portion, a complete wheel structure of the disk type is secured which consists of a minimum number of parts, thereby reducing considerably the cost of manufacturing the same at the same time that the weight thereof is reduced to a minimum without the sacrifice of necessary strength and rigidity. The construction furthermore provides for a concealed brake drum and a rim which is circumferentially continuous in extent. In addition to this, by forming the brake drum integrally with the rim the brake torque is transferred directly to the rim without subjecting the hub to undue strains and stresses, this latter being an important desideratum in the design of vehicle wheel.

It will be understood of course that various changes in the invention may be made from time to time without departing from the general spirit or principles thereof and it is accordingly intended to claim the invention broadly, as well as specifically, as indicated by the appended claim.

What is claimed as new and useful is:—

A vehicle wheel comprising, in combination, a main body in the form of a web whose inner radial portion lies in a plane spaced from the mid-plane of the wheel, said web being bent diagonally axially inwardly and then radially outwardly beyond said inner radial portion, said web terminating in a relatively thin gauge section constituting an annular portion of a rim, a second annular rim part secured to said radially outwardly extending portion of said main body and having an axially extending flange at its inner radial extremity, and fairings connecting the extremities of said rim to the inner radial portion of the main body and the axial flange of said second rim section respectively, whereby to give said wheel a stream line effect.

In testimony whereof I hereunto affix my signature.

GERHARD C. R. KUIPER.